US006979039B2

(12) United States Patent  
Takemura et al.

(10) Patent No.: US 6,979,039 B2
(45) Date of Patent: Dec. 27, 2005

(54) WINDSHIELD UNIT FOR MOTORCYCLE

(75) Inventors: Hiroo Takemura, Wako (JP); Noriko Yoshimura, Wako (JP); Masato Nagata, Wako (JP); Toshikazu Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/793,106

(22) Filed: Mar. 3, 2004

(65) Prior Publication Data

US 2005/0110295 A1 May 26, 2005

(30) Foreign Application Priority Data

Mar. 14, 2003 (JP) .............................. 2003-070228

(51) Int. Cl.[7] .............................................. B62J 17/04
(52) U.S. Cl. .................................................... 296/78.1
(58) Field of Search .............................. 296/78.1, 77.1, 296/84.1, 91; 180/68.1, 903; 280/288.4, 280/304.3, 152.1, 852; B62J 17/04

(56) References Cited

U.S. PATENT DOCUMENTS

| 4,354,570 A | * | 10/1982 | Tanaka et al. ............... 180/219 |
| 4,709,774 A | * | 12/1987 | Saito et al. .................. 180/229 |
| 4,911,494 A | * | 3/1990 | Imai et al. .................. 296/78.1 |
| 5,409,287 A | * | 4/1995 | Suzuki ..................... 296/180.1 |
| 5,577,570 A | * | 11/1996 | Shiohara et al. ............. 180/219 |
| 5,715,904 A | * | 2/1998 | Takahashi et al. .......... 180/229 |
| 6,276,482 B1 | * | 8/2001 | Moriya et al. .............. 180/229 |
| 6,290,016 B1 | * | 9/2001 | Umeoka ..................... 180/219 |
| 6,543,831 B2 | * | 4/2003 | Takemura et al. ......... 296/78.1 |
| 6,588,529 B2 | * | 7/2003 | Ishii et al. .................. 180/219 |
| 2002/0041107 A1 | * | 4/2002 | Takemura et al. ......... 296/78.1 |
| 2003/0062740 A1 | * | 4/2003 | Takemura et al. ......... 296/78.1 |

FOREIGN PATENT DOCUMENTS

| EP | 1081032 | * | 3/2001 | ............ B62J 17/04 |
| JP | 2-33794 | | 3/1990 | |

* cited by examiner

Primary Examiner—H. Gutman
(74) Attorney, Agent, or Firm—Hamre, Schumann, Mueller & Larson, P.C.

(57) ABSTRACT

This invention relates to a windshield unit for a motorcycle which is capable of reducing hissing noises of wind and improving performance of discharging water without detracting from the motorcycle's appearance while eliminating wind buffeting. The windshield unit includes a wind screen which shields running wind on a cowl disposed on a front portion of the motorcycle body, an air inlet port which guides the running wind to the back side of the wind screen, and an air guide plate which guides air upward and backward from the air inlet port, a step portion with a step on a top surface of the air guide plate that is directed backward and downward to form a drain.

10 Claims, 17 Drawing Sheets

FIG. 9
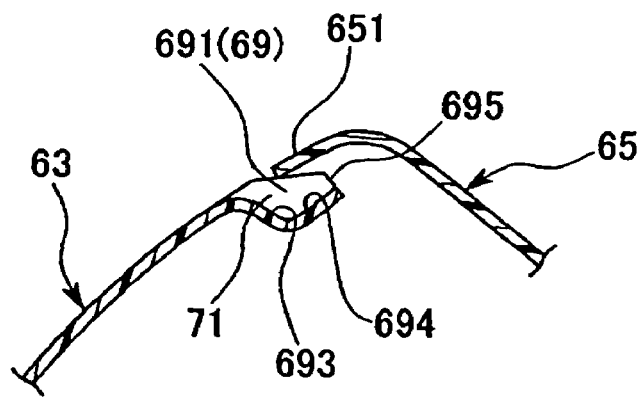
FIG. 10
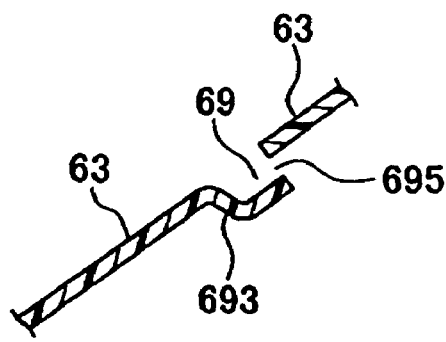
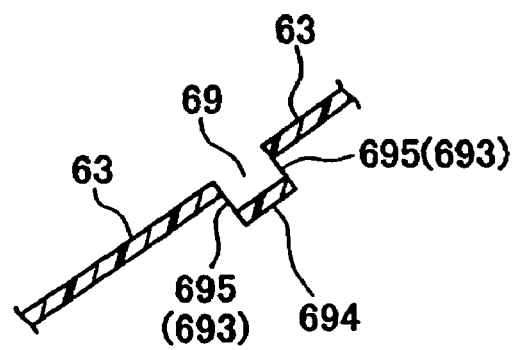
FIG. 11

FIG. 20
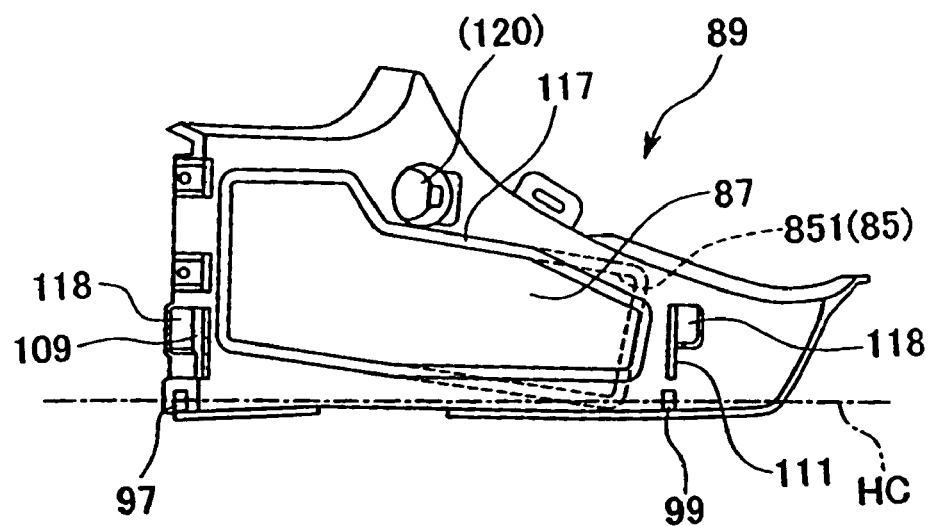
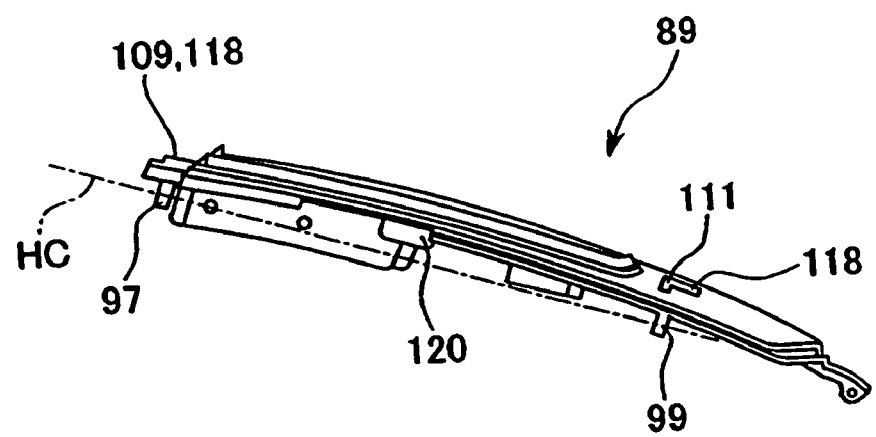
FIG. 21

WINDSHIELD UNIT FOR MOTORCYCLE

CROSS REFERENCE TO RELATED APPLICATIONS

This application is based on Japanese Patent Application NO. 2003-070228.

FIELD OF THE INVENTION

The present invention relates to a windshield unit for a motorcycle that minimizes wind buffeting.

BACKGROUND OF THE INVENTION

Conventional windshields commonly have a structure in which a front cowl is disposed on a front portion of a motorcycle and includes a screen, otherwise known as a windshield, secured thereto for forward view. This screen protects the rider from running wind, rainwater, and dust. However, the running wind which passes over the screen can generate negative pressure behind the screen, which creates swirling currents in the face of the rider and also right behind the rider. The swirling currents can increase drag as well as make the driver uncomfortable. To solve this problem an air inlet port can be provided in a lower portion of the screen so that air taken in from the air inlet port can be channeled between the screen and an air guide plate disposed behind the screen. The air channeled behind the screen can be joined with the air in front of the screen to prevent negative pressure that causes swirling currents that make the rider uncomfortable.

Incidentally, while the above-mentioned air inlet port reduces negative pressure, it also allows rainwater to be channeled behind the screen. Hence, a ridge to block rainwater from reaching the rider can be formed on the air guide plate. The rainwater accumulated on the air guide plate can be gathered to be discharged from a drain formed on the air guide plate (see JP 02-33794).

However, in the foregoing conventional windshield, although rainwater can be blocked from going backward by means of the ridge formed on the air guide plate, the ridge generates unpleasant hissing noises as air passes over the ridge.

In addition, since the drain used to discharge rainwater is formed on the air guide plate, the functional parts inside the air guide plate can be seen through the drain, thereby degrading the appearance of the motorcycle.

This present invention provides a windshield unit for a motorcycle which can, without damaging the motorcycle's appearance, reduce hissing noises and improve water discharge.

BRIEF SUMMARY OF THE INVENTION

To solve the aforementioned problems, a windshield unit for a motorcycle where a screen which shields running wind is provided on a cowling disposed on a front portion of a motorcycle. An air inlet port which guides the running wind to a back side of the screen is formed and an air guide plate which guides the running wind upward and backward from the air inlet port is also provided. A step portion is formed on a top surface of the air guide plate and is directed backward and downward. The step portion is disposed along a body width direction and includes a sidewall that is opened to form a drain.

The invention enables running wind to be guided from the air inlet port to the back side of the screen along the air guide plate. Liquid left on the air guide plate is guided backward along the air guide plate step portion and discharged through opened drains in the sidewalls of the step portions.

In one embodiment, the step portion is provided at a joint portion between the air guide plate and a separate member disposed adjacent to the air guide plate. In this embodiment, the step portions are covered by the separate member and are thus hidden from plain view.

In another embodiment, the separate member disposed adjacent to the air guide plate is extended above the step portion of the air guide plate. In this embodiment, air-flow shifting operations by the separate member against running wind passing through the step portions can be exhibited, and, at the same time, the step portions can be covered by the separate member.

In yet another embodiment, a rib (for example, a rib 71) extending in a longitudinal direction of the body at the step portion is provided. The rib restricts movement of raindrops along the inclination of the body in the right and left directions of the body. Moreover, the ribs can be effectively utilized as the positioning members in the joint portions of the separate member.

According to the invention, when running wind guided from the air inlet port to the back side of the screen flows along the air guide plate, raindrops left on the air guide plate are smoothly guided backward along the air guide plate to run into the step portions, and discharged without fail from the opened drains of the sidewalls of the step portions. Therefore, hissing noises of the wind can be limited to the minimum. At the same time, since the drains are not exposed to the outside while the performance of discharging water is ensured, there is an effect that the appearance quality can be improved.

Also according to the invention, since the step portions can be covered by a separate member and are thus difficult to see from outside, the motorcycle's appearance is further improved. Moreover, since the step portions are not exposed to the outside, there is an effect that the degree of freedom in molding the step portions can be increased.

In an alternative embodiment of the invention, since the air-flow shifting operation by a separate member against running wind passing through the step portions can be exhibited, hissing noises of the wind can be remarkably reduced. At the same time, since the step portions can be covered by the separate member without fail, the appearance can be further improved.

Also, since movement of raindrops along the inclination of the body in the right and left directions of the body can be restricted by the step portions, the raindrops can be efficiently discharged. Moreover, since the ribs can be effectively utilized as the positioning members in the joint portions of a separate member, assembly of the part is made easier.

BRIEF DESCRIPTION OF THE DRAWINGS

FIG. 9 is an enlarged view of main parts in FIG. 7.

FIG. 10 is a sectional view of the main parts of alternative embodiment.

FIG. 11 is a sectional view of the main parts of alternative embodiment.

FIG. 20 is a plan view of the left item housing chamber.

FIG. 21 is a side view of the left item housing chamber.

DETAILED DESCRIPTION OF THE INVENTION

Figure 1:
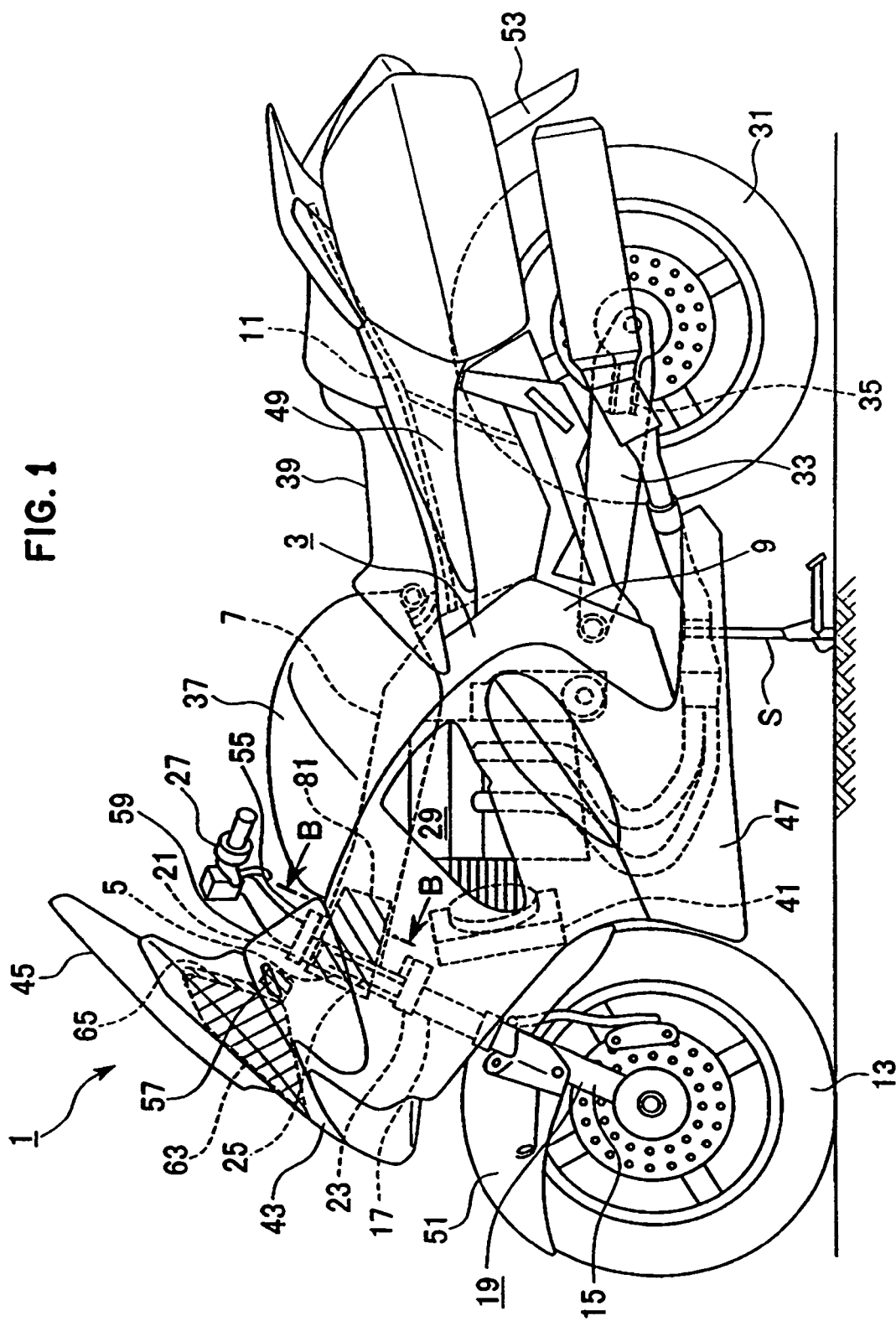
FIG. 1 is a side view of a motorcycle of a first embodiment of the present invention.

Now referring to FIG. 1, a first embodiment of this invention will be described with reference to the drawings. FIG. 1 is a side view of a motorcycle. A body frame 3 of the motorcycle 1 includes a head tube 5, a main tube 7 extending diagonally rearward from the head tube 5, a center tube 9 extending downward from the rear end of the main tube 7, a seat rail 11 extending rearward from the main tube 7, and the like. Note that FIG. 1 shows a state where the body is supported by a center stand S.

A front wheel 13 is suspended and supported by right and left front forks 19, each of which is made up of an outer case 15 and an inner case 17. The top portion of each inner case 17 is supported by a top bridge 21 and a bottom bridge 23, and a steering stem 25 inserted through the head tube 5 and connected to the top bridge 21 and the bottom bridge 23. A handle 27 to steer the front wheel 13 is provided on the top bridge 21.

An engine 29 is supported by the main tube 7 and the center tube 9, a rear wheel 31 is supported through a rear fork 33, and the rear wheel 31 is driven by the engine through a drive shaft 35.

A fuel tank 37 is provided over the main tube 7, a seat 39 is provided over the seat rail 11, and a radiator 41 is provided at the back of the forks 19 at an angle with respect to the front position of the engine 29.

As shown, the motorcycle 1 is a full cowling type two-wheeled vehicle which includes a front cowl (cowling) 43 covering a front portion of the body, a wind screen (screen) 45 mounted on a top portion of the front cowl 43, a side cowl 47 covering a side portion of the body, a seat cowl 49 covering a bottom portion of the seat 39, a front fender 51 covering a top portion of the front wheel 13, and a rear fender 53 covering a top portion of the rear wheel 31.

Figure 2:
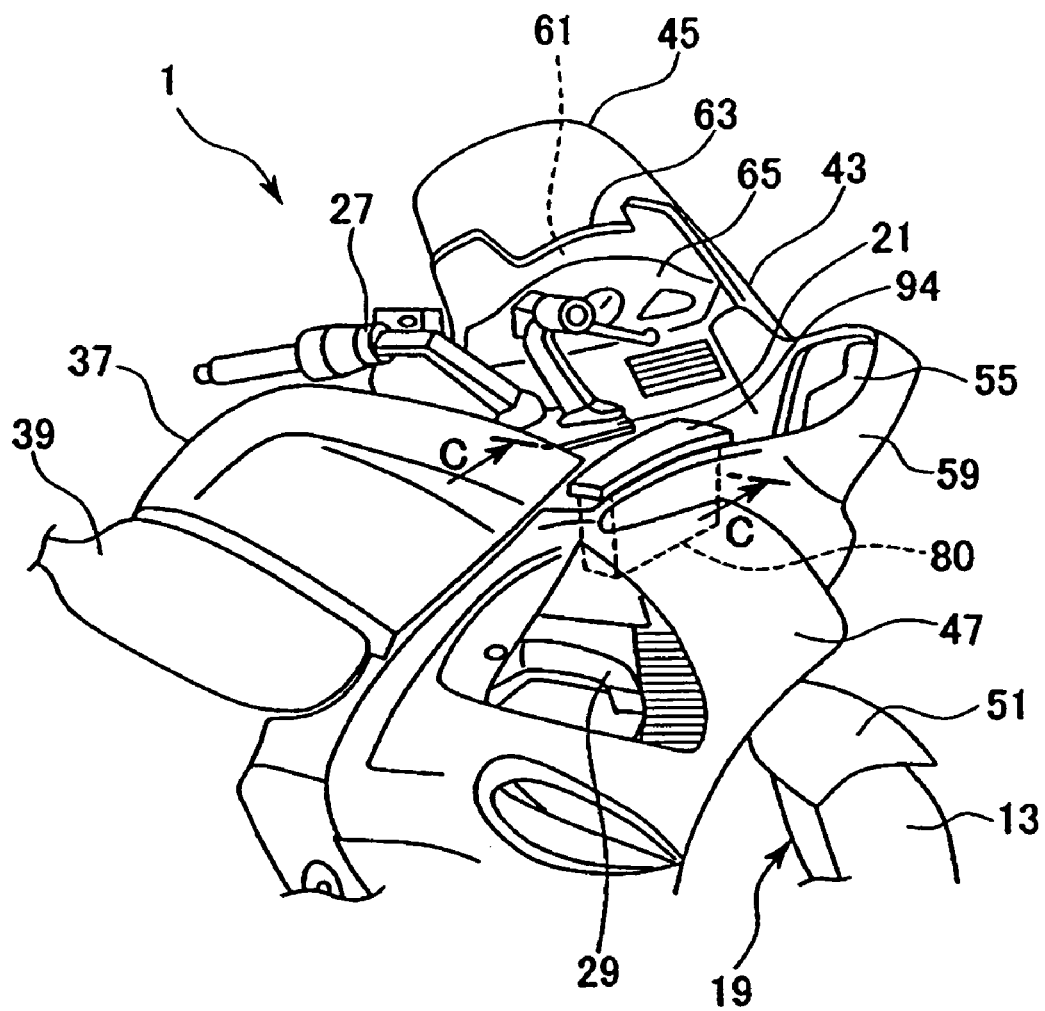
FIG. 2 is a partial perspective view of the motorcycle of the first embodiment.
Figure 3:
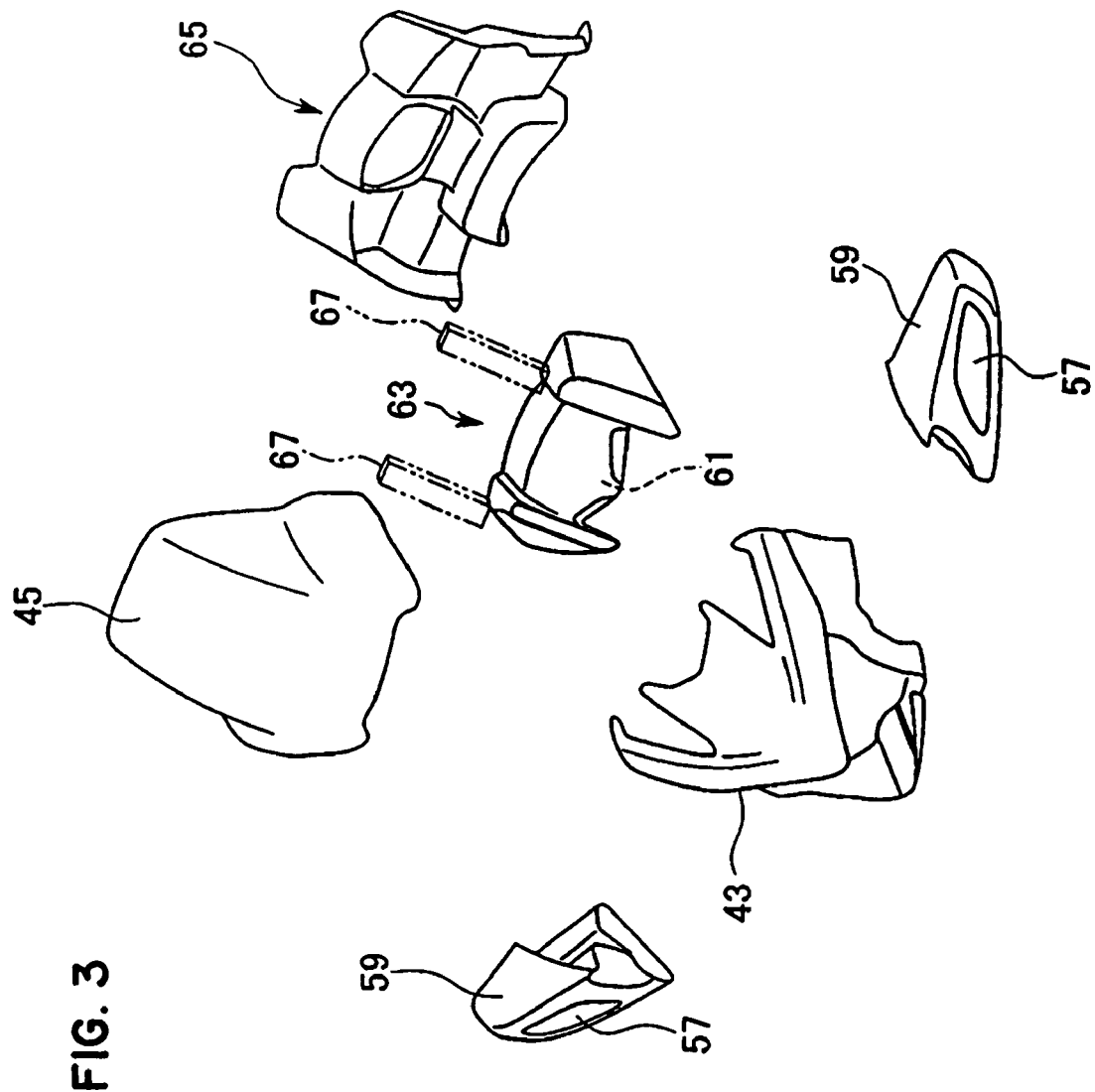
FIG. 3 is a perspective view of dismantled main parts of the first embodiment.

As also shown in FIGS. 2 and 3, a pair of mirror covers 59, each of which covers a rear-view mirror 55 and includes a turn signal lamp 57, is mounted at the right and left of the front cowl 43. An air guide plate 63 which guides upward and backward running wind introduced into an air inlet port 61 opening behind the wind screen 45 is mounted on the upper brim of the front cowl 43. The air inlet port 61 is formed between the back surface of the wind screen 45 and the air guide plate 63. Moreover, a meter-visor (separate member) 65 is mounted at the back of the air guide plate 63, and, at an upper portion of the air guide plate 63, the wind screen 45 is mounted through a tilt angle changing mechanisms (diagrammatically shown) 67 so that the tilt angle thereof can be changed. A negative pressure region, which is generated in front of the face of the driver due to running wind flowing along the front surface of the wind screen 45, disappears when running wind flows backward along the air guide plate 63. Thus, running resistance (drag) is significantly reduced and the driver no longer buffed by the air currents.

Figure 4:
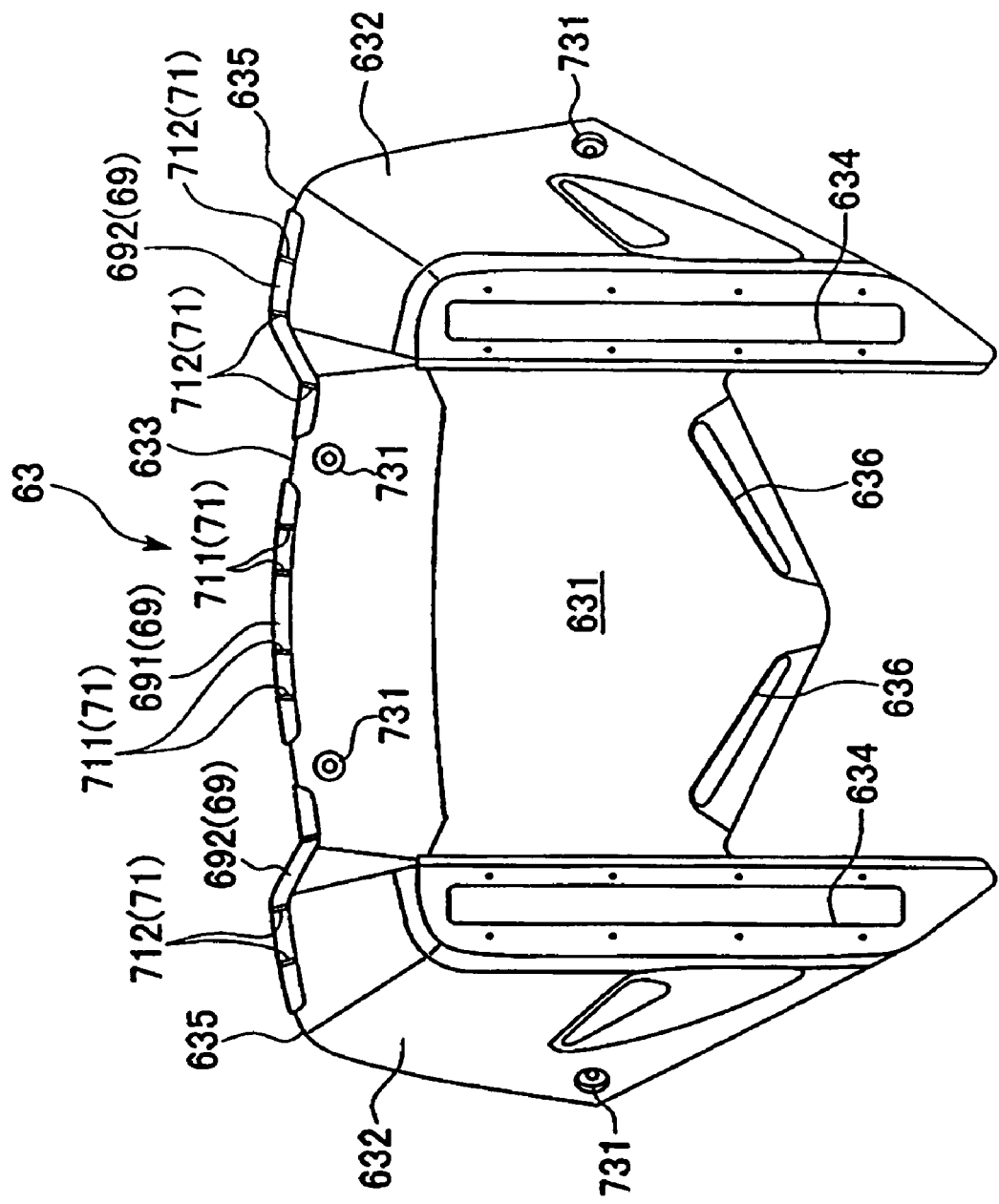
FIG. 4 is a plan view of an air guide plate.
Figure 6:
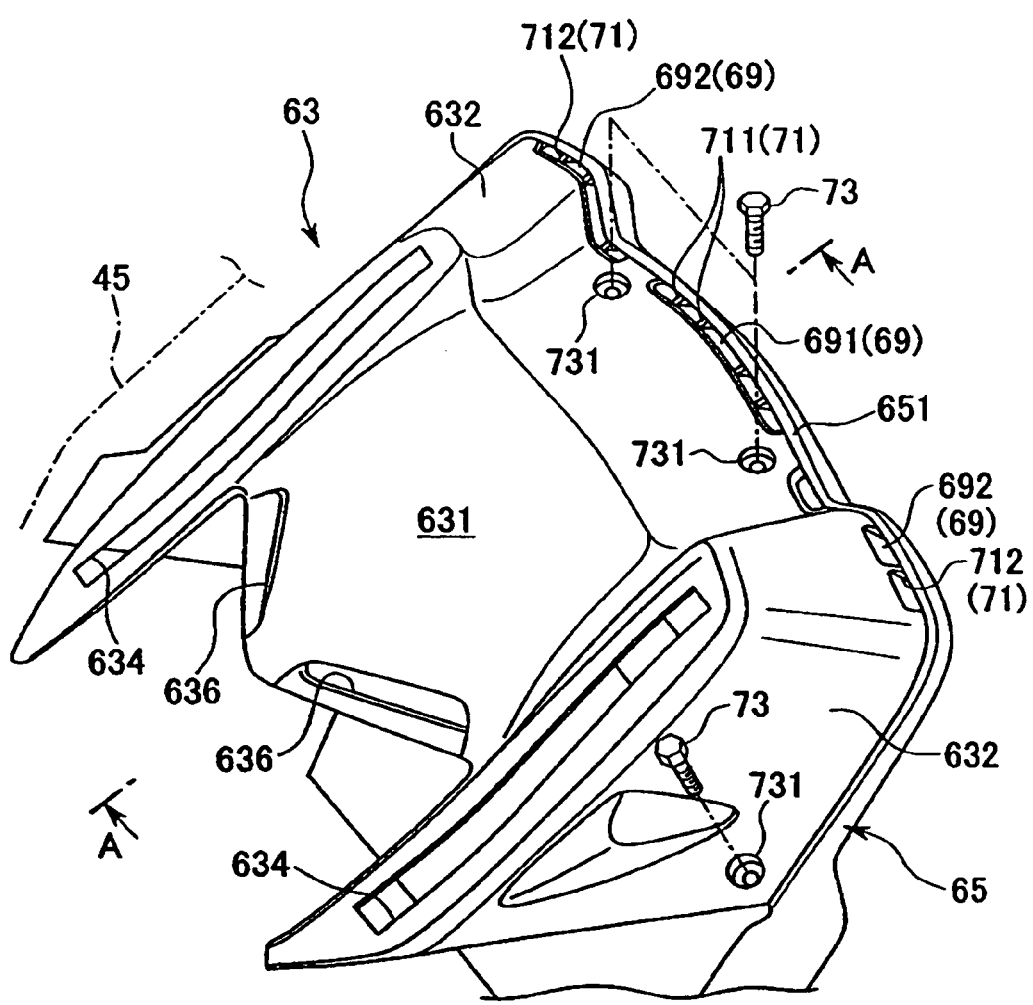
FIG. 6 is a perspective view showing a state of attaching the meter-visor to the air guide plate.

As shown in FIGS. 4 and 6, the air guide plate 63 can be a member in which the bottom edge of a center portion 631 is formed to have a triangle shape and mount portions 632 for the wind screen 45 is formed at the right and left of the center portion 631 such that the mount portions 632 are upheaved from the center portion 631 and protrude downward below the center portion 631. The center portion 631 is formed to be slightly bent at the upper portion thereof toward a rider (see FIGS. 6 and 7), and a top edge 633 is formed in a smooth arc shape. On the front surface of the mount portions 632, opening portions 634 for mounting the tilt angle changing mechanisms 67 of the wind screen 45 are formed along a vertical direction.

Moreover, top edges 635 of the mount portions 632 are formed to be upheaved from the top edge 633 of the center portion 631. In other words, the top edge of the center portion 631 is formed in a position lower than the top edges of the mount portions 632 so that the forward view of the center portion 631 can be secured. Note that in the lower portion of the center portion 631, opening portions 636 which take in running wind to the back side of the air guide plate 63 and introduce the running wind to later-described louvers 653 are formed.

At the top edge 633 of the center portion 631 and at portions lying between the top edge 633 and the top edges 635, step portions 69 are formed. In other words, there are disposed a step portion 691 provided in the body width direction on the center portion 631 and right and left step portions 692 provided in the body width direction from the center portion 631 to the mount portions 632 for the wind screen 45.

Figure 7:
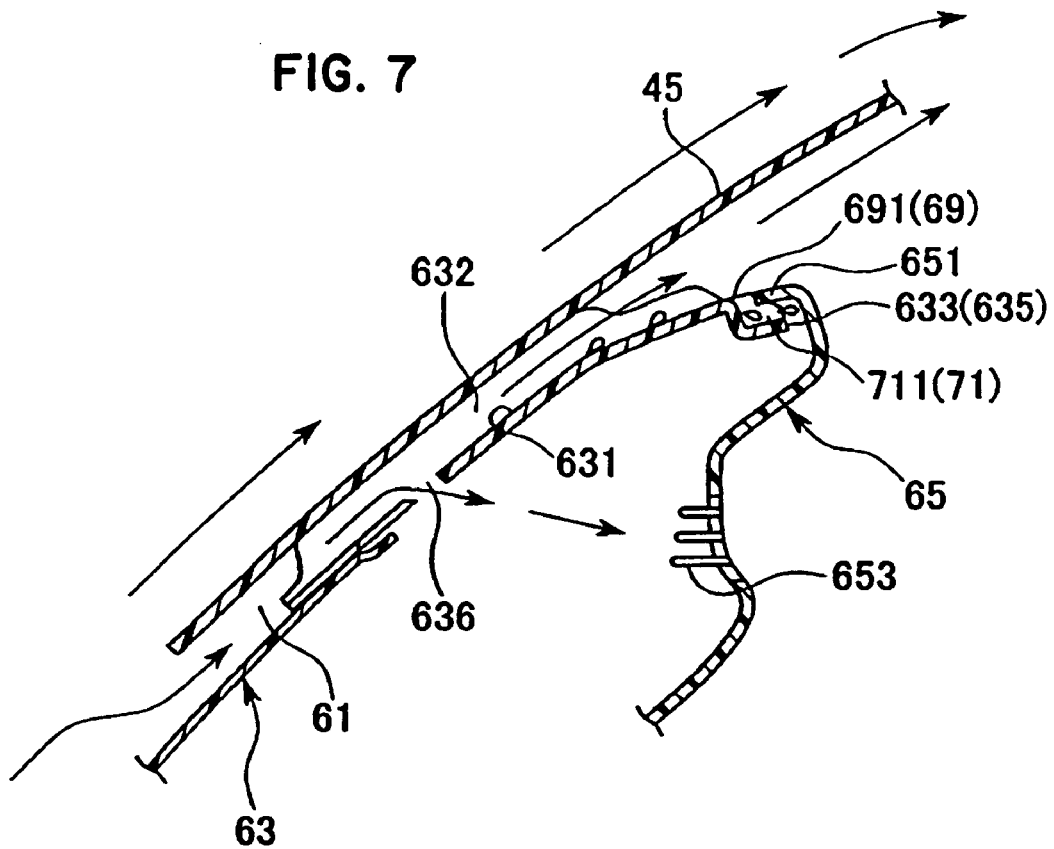
FIG. 7 is a sectional view along a line A—A in FIG. 6.
Figure 8:
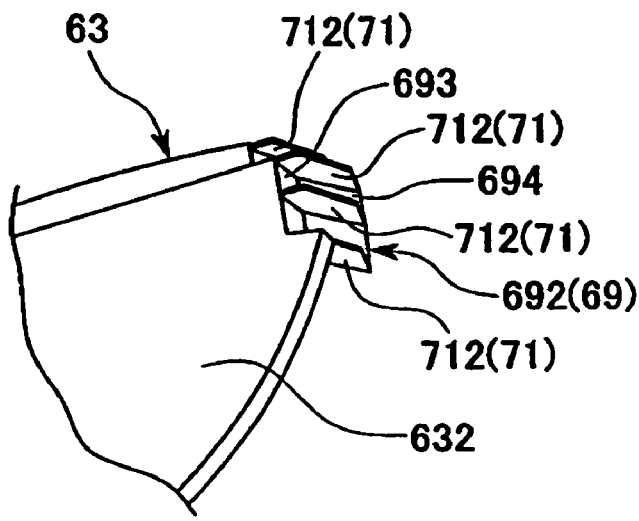
FIG. 8 is a partial perspective view of the air guide plate.

As shown in FIGS. 7 to 9, each step portion 69 is pulled down backward from the top surface of the air guide plate 63 along a sidewall 693 to form a flat bottom wall 694. The sidewall 693 at the back of the bottom wall 694 is made open, and this opened back sidewall 693 is formed to be a drain 695. The step portions 69 and ribs 71 are formed along the longitudinal direction of the body, namely, the front-rear direction. In this embodiment, as shown in FIGS. 4 and 6, ribs 711 are formed at four points at predetermined intervals in the step portion 691 of the center portion 631, and ribs 712 are respectively formed at three points at predetermined intervals in the right and left step portions 692 lying from the center portion 631 to the mount portions 632.

As shown in FIG. 7, the air inlet port 61 can be formed between the wind screen 45 and the air guide plate 63. Since liquid that enters the inlet port 61 generally moves up the air guide plate 63, the step portions 69 are formed across the body width direction. The right and left step portions 692 include ribs 712 that are formed to slightly face outward. FIG. 8 shows a state where the right and left step portions 692 are viewed from a side. In addition, the meter-visor 65 shown in FIG. 6 is disposed adjacent to the back side of this air guide plate 63, and the air guide plate 63 and the meter-visor 65 are attached by bolts 73 such that the step portions 69 of the air guide plate 63 are positioned at joint portions of the air guide plate 63 with the meter-visor 65. Note that insertion holes 731 for the bolts 73 and tightening portions 65 are formed on the air guide plate 63 and on the meter-visor 65.

Figure 5:
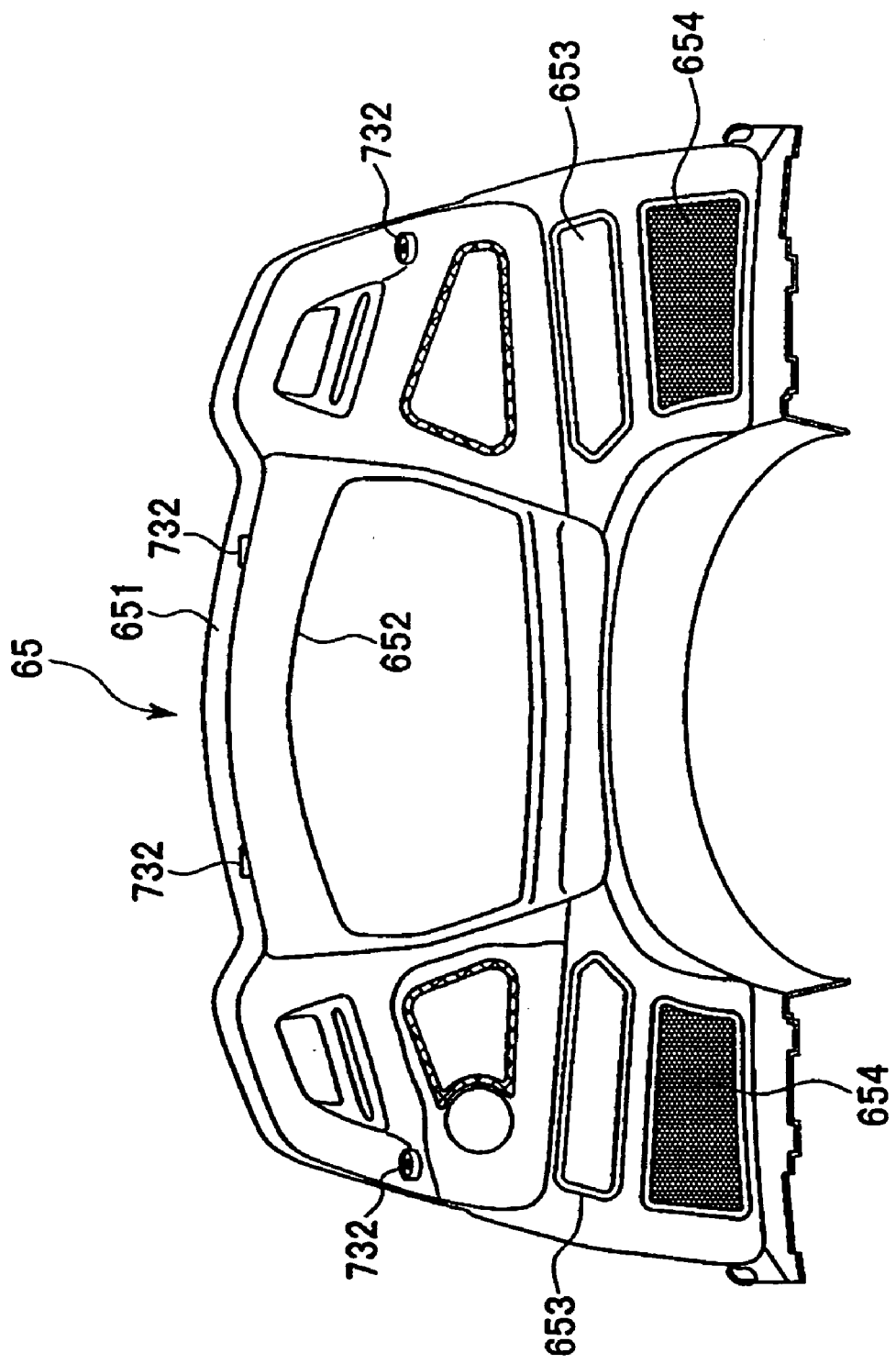
FIG. 5 is a plan view of a meter-visor.

As shown in FIG. 5, the top edge of the meter-visor 65 is formed to be in conformity with the top edges 633 and 635 of the air guide plate 63. In addition, the meter-visor 65 and the air guide plate 63 together are positioned at the back of the wind screen 45. At the top edge of the meter-visor 65, there is provided a flange portion 651 formed to be bent inward. This flange portion 651 is extended toward a position along the top surface of the air guide plate 63. This position is above the step portions 69 of the air guide plate 63, and faces the bottom wall 694 of the step portion 69. The flange portion 651 of the meter-visor 65 may be structured to be in contact with the top edges of the respective ribs 71, whereby the ribs 71 of the air guide plate 63 can function as positioning members for the meter-visor 65.

In the center portion of the meter-visor 65, a mount hole 652 for a meter unit which is not shown is formed. In the lower right and left portions, a louver 653 is provided on each upper side thereof, and a mount portion 654 for a speaker is formed on the back surface below the louver 653.

In the above described embodiment, the step portions 69 are provided in the joint portions of the air guide plate 63 with the meter-visor 65. However, other aspects as shown in FIGS. 10 to 13 are applicable. Note that, in FIGS. 10 to 13, the ribs are omitted for convenience of illustration.

Shown in FIG. 10 is the step portion 69 which is not provided in the joint portion of the meter-visor 65 but provided on the upper surface of the air guide plate 63. Accordingly, costs can be reduced because it is necessary only to process the air guide plate 63.

Moreover, as shown in FIG. 11, two drains 695 may be provided in the front and back of the bottom wall 694 by opening the front and back sidewalls 693 of the step portion 69. Thus, compared to a case where one drain 695 is provided, the ability and performance of discharging water can be improved.

Figure 12:
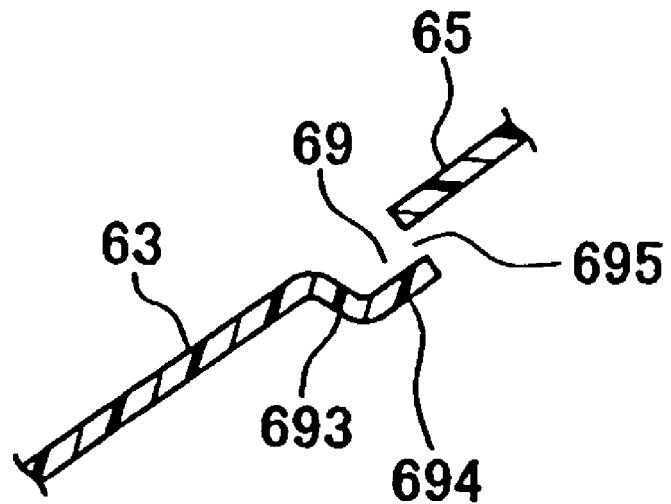
FIG. 12 is a sectional view of the main parts of alternative embodiment.

Further, as shown in FIG. 12, the drains 695 are not limited to the joint portions of the air guide plate 63 with the flange portion 651 of the meter-visor 65 as in the above-described embodiment. The top edge portion of the meter-visor 65 may be extended toward the front side, and the drains 695 of the step portions 69 of the air guide plate 63 may be covered by this top end portion. In other words, the meter-visor 65 does not need to extend up to the position facing the bottom walls 694 of the step portions 69, and stopped short thereof. Thus, it is advantageous in that the flange portion 651 is not required to be provided on the meter-visor 65.

Figure 13:
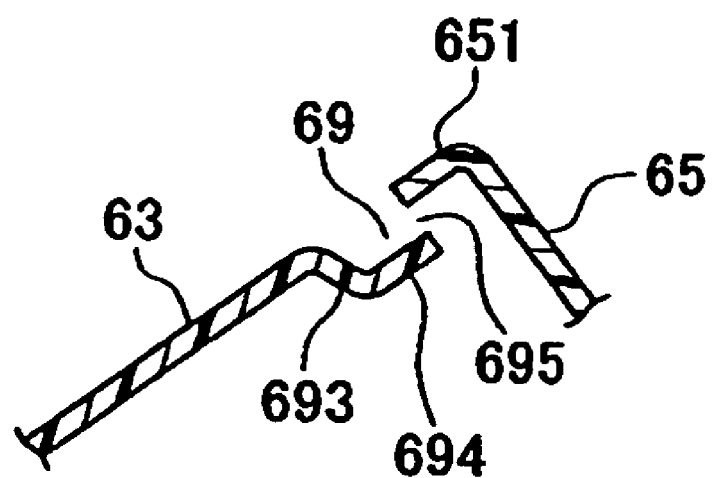
FIG. 13 is a sectional view of the main parts of still another embodiment.
Figure 14:
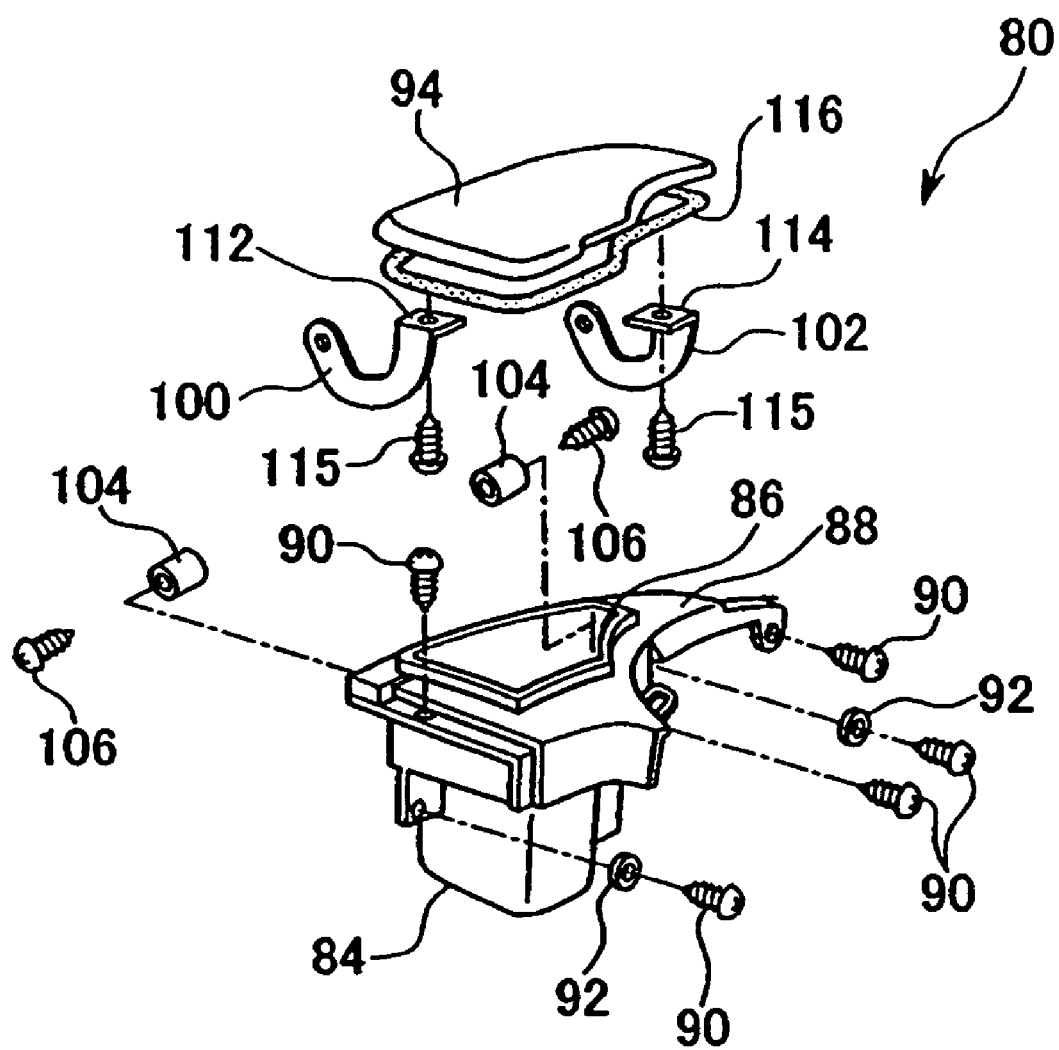
FIG. 14 is a perspective view of a dismantled right item housing chamber.
Figure 15:
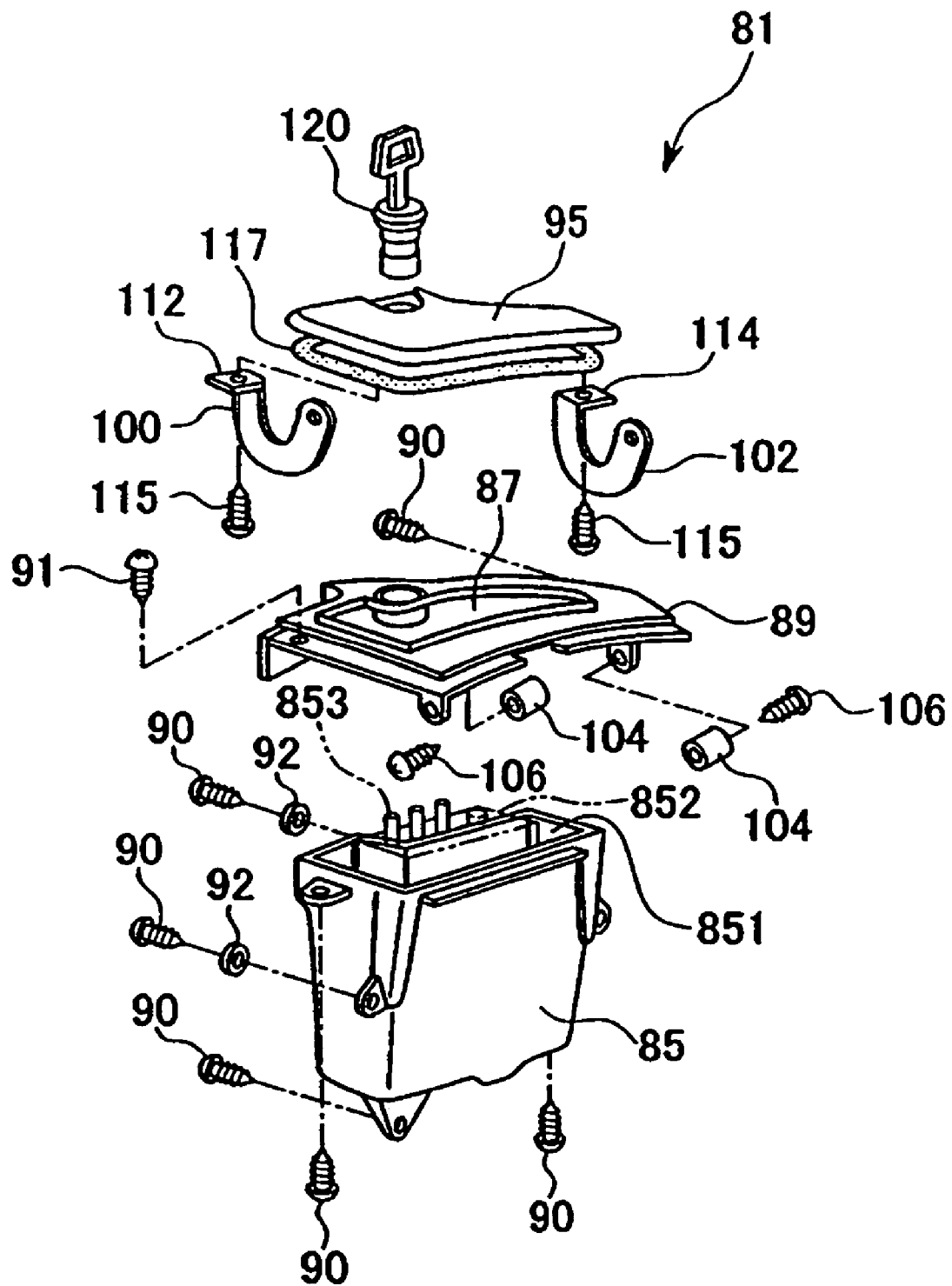
FIG. 15 is a perspective view of a dismantled left item housing chamber.
Figure 16:
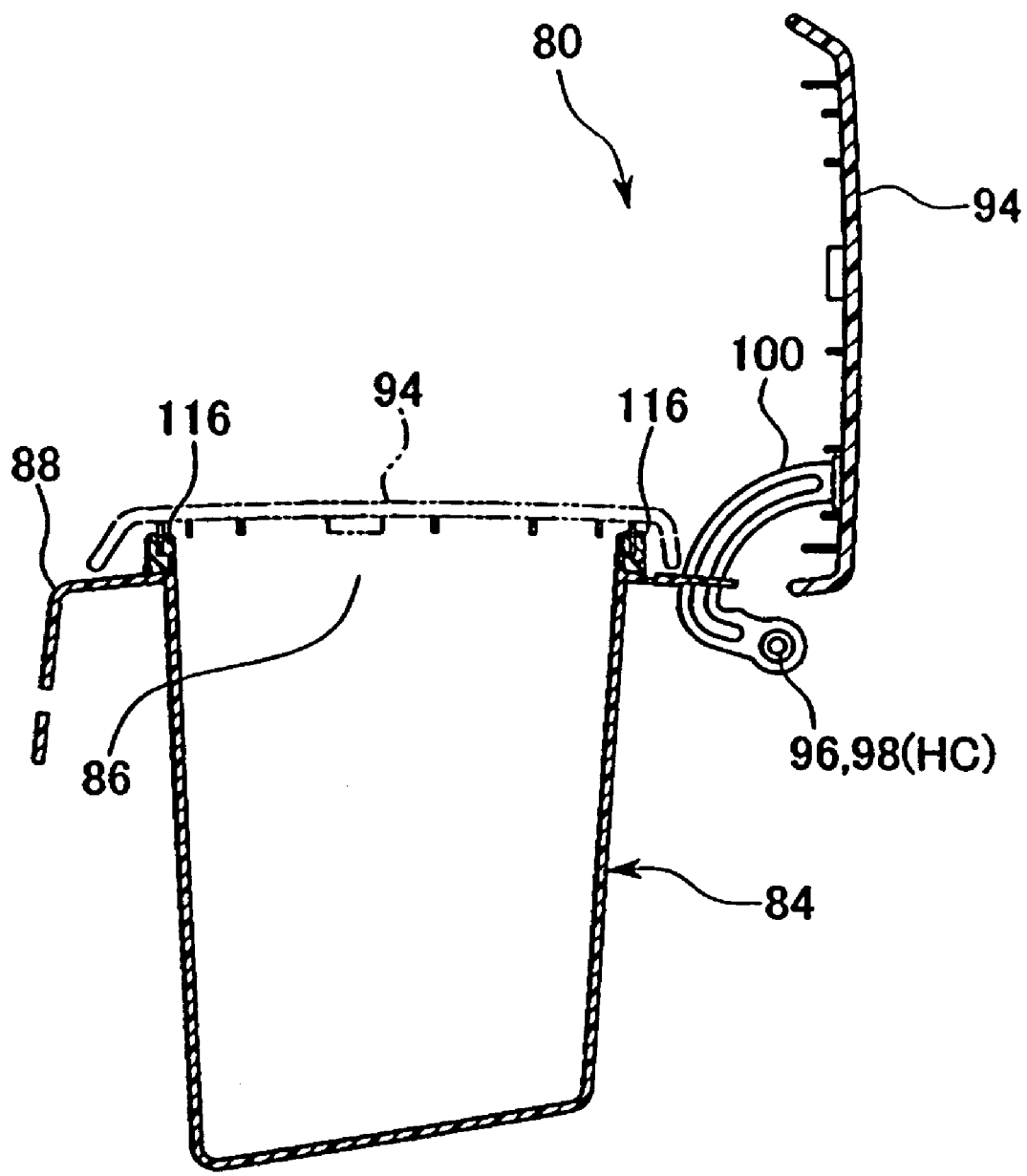
FIG. 16 is a sectional view of the right item housing chamber taken along a C—C line in FIG. 2.
Figure 17:
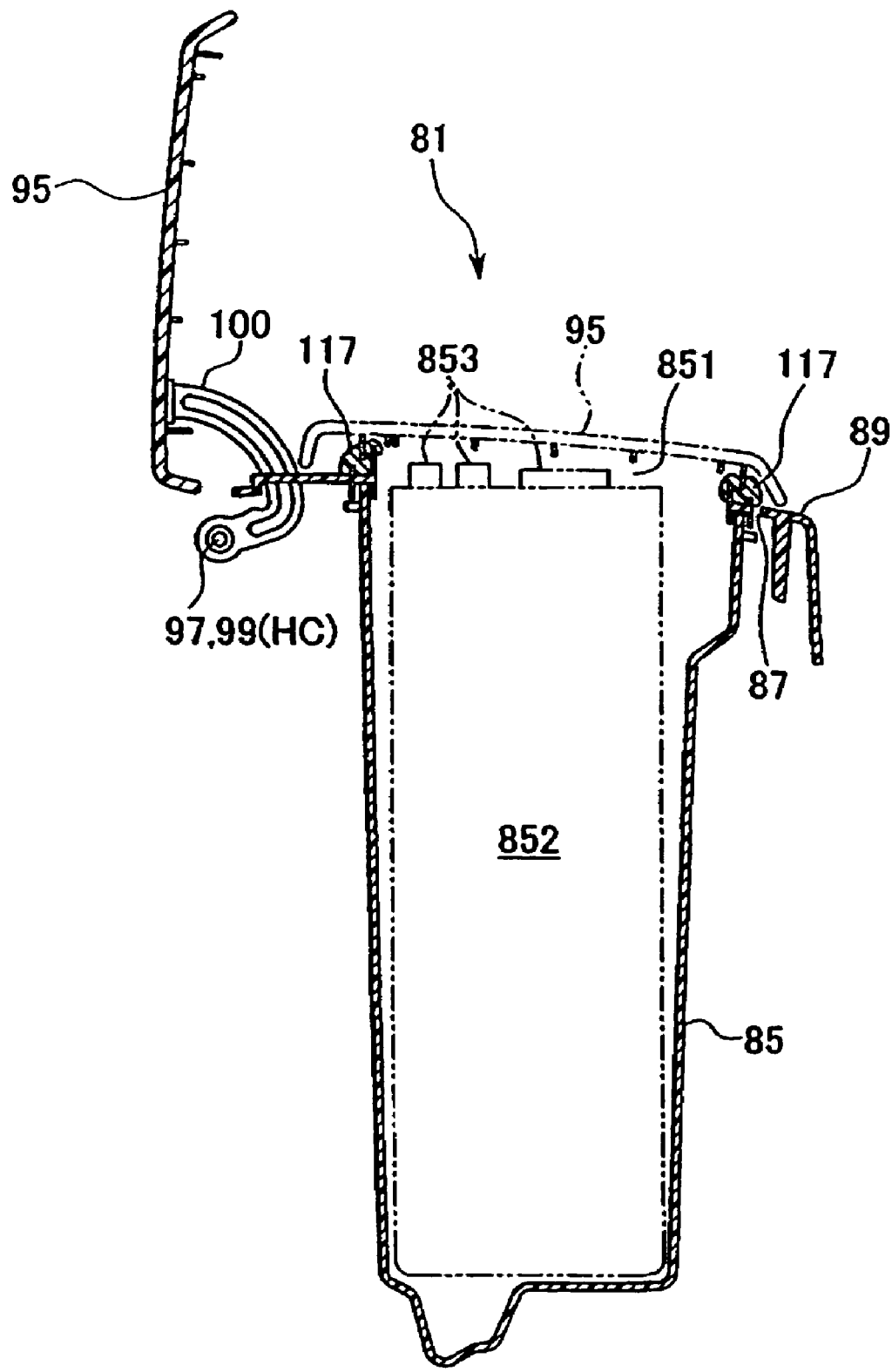
FIG. 17 is a sectional view of the left item housing chamber taken along a B—B line in FIG. 1.

Furthermore, as shown in FIG. 13, also in a case where the flange portion 651 of the meter-visor 65 is extended to the step portions 69 of the air guide plate 63, the meter-visor 65 does not need to extend up to the portion facing the bottom walls 694, and is stopped short thereof.

With such a structure, compared to a case where the flange portion 651 of the meter-visor 65 is extended up to the position facing the bottom walls 694 of the step portions 69, larger opening portions can be secured in substance on the top surface of the air guide plate 63. Hence, the amount of raindrops to be taken in from the step portions 69 can be increased, and the performance of discharging water can be improved.

According to the embodiments described above, during driving in the rain or the like, when running wind which is guided from between the back surface of the wind screen 45 and the front cowl 43 and is taken in from the air inlet port 61 between the wind screen 45 and the front surface of the air guide plate 63 flows along the air guide plate 63, raindrops left on the air guide plate 63 are guided backward along the air guide plate 63 to run into the step portions 69. Therefore, compared to a case where the raindrops are gathered using a ridge, hissing noises of wind can be reduced significantly.

Here, the raindrops which have run into the step portions 69 are discharged without fail from the drains 695 formed by opening the sidewalls 693 of the step portions 69. Hence, performance of discharging water can be remarkably improved. Moreover, since the flange portion 651 at the edge of the meter-visor 65 is disposed and extended above the step portions 69 of the air guide plate 63, the drains 695 are not seen through the wind screen 45 or the like. Therefore, interior functional parts are not exposed to the outside, whereby an appearance quality is improved.

Further, since the step portions 69 themselves are also difficult to see from outside as they are covered by the flange portion 651 of the meter-visor 65, the appearance quality is even more improved also in this point. At the same time, since the step portions 69 themselves are not exposed to the outside, there is no restriction on molding, and the step portions 69 can be molded in a shape where optimum performance of discharging water can be exhibited. Thus, degree of freedom in designing can be increased.

Furthermore, since the flange portion 651 of the meter-visor 65 is formed and extended above step portions 69 to exhibit air-flow shifting operation against running wind passing through, hissing noises of the wind can be remarkably reduced.

In addition, since movement of raindrops along the inclination of the body in the right and left directions of the body can be restricted by the ribs 71 of the step portions 69, the raindrops can be efficiently discharged. Moreover, if the ribs 71 are effectively utilized as positioning members in the joint portions of the meter-visor 65 when attaching the meter-visor 65, easiness of fixedly attaching can be improved.

Note that, according to this embodiment, the flange portion 651 of the meter-visor 65 is disposed and extended toward a position along the top surface of the air guide plate 63. This position is above the step portions 69 of the air guide plate 63, and is facing the bottom wall 694 of the step portions 69. Hence, since not only the drains 695 but also most of the step portions 69 are covered by the flange portion 651 of the meter-visor 65, therefore the drains 695 are difficult to see from outside while the performance of discharging water is ensured. Thus the appearance quality can be improved.

Note that, this invention is not limited to the above embodiments, and is applicable to scooter type vehicles, for example, as long as a front cowl is provided thereto.

As shown by a shaded area surrounded by a dotted line in FIG. 1 and by a dotted line in FIG. 2, item housing chambers 80, 81 are respectively provided inside the right and left side cowls 47 at the sides of the fuel tank.

As shown in FIGS. 14, 16, 18, 19 and 22, the right item housing chamber 80 is integrally formed of an item chamber main body 84 and an upper plate 88 having an opening portion 86, and mounted to the side cowl 47 and the body by use of screws 90 and washers 92. To the opening portion 86 of the upper plate 88, a lid 94 is attached to be able to open and close. This lid 94 is structured to open toward the outside of the vehicle in consideration of that the housed item is taken in and out.

To hinge portions 96, 98 (shown in FIGS. 16, 18 and 19) at the front and rear of the upper plate 88, the bottom end portion of a front hinge arm 100 at the front side and the bottom end portion of a rear hinge arm 102 at the rear side are rotatably supported by a collar 104 and a screw 106, respectively. The top end portions of the front hinge arm 100 and the rear hinge arm 102 are protruding upward from opening portions 108, 110 formed on the upper plate 88, respectively, and respective flange portions 112, 114 formed on these top end portions are attached on the back surface of the lid 94 by screws 115. Here, at one side of each of the opening portions 108, 110 on the top surface of the upper plate 88, a recessed escape portion 118 of the respective flange portions 112, 114 is formed so that the respective flange portions 112, 114 of the respective hinge arms 100, 102 do not interfere with the upper plate 88 when the lid 94 is closed. Note that the reference numeral 116 denotes a seal material to be attached to the back surface of the lid 94.

As shown in FIGS. 15, 17, 20 and 21, the left item housing chamber 81 is formed of separated members of an item chamber main body 85 and an upper plate 89 having an opening portion 87, which are fixedly attached to each other by a screw 91. The fixedly attached both members are mounted to the side cowl 47 and the body by use of the screws 90 and the washers 92. To the opening portion 87 of the upper plate 89, a lid 95 is attached to be able to open and close. The item housing chamber main body 85 has a top opening portion 851 whose shape is different from that of the opening portion 87 of the upper plate 89, and houses an audio unit 852 which is not taken in and out normally. Operation knobs 853 of the audio unit 852 are protruding from the top opening portion 851 and the opening portion 87 of the upper plate 89 is formed to surround disposed positions of the operation knobs 853.

Thus, by separately structuring the item housing chamber main body 85 and the upper plate 89, the degree of freedom in selecting an item to be housed can be increased. That is, if the two members are integrally formed, the size of the item to be housed is limited because there is restriction concerning the shape of the opening portion 87 of the upper plate 89; however, by separating the two members, the opening portion 87 of the upper plate 89 is required only to function as, for example, an opening necessary for the operation, and thus the size of the item to be housed in the item housing chamber main body 85 does not really matter.

Hence, although description has been made by taking the audio unit 852 as an example, the main body unit of a car navigation system can be installed instead of the audio unit 852 on condition that operation of the device is available through the opening portion 87 of the upper plate 89. Moreover, it is possible to allow the user to select between the audio unit and the car navigation system according to his/her preference.

Here, the lid 95 of the left item housing chamber 81 is also structured to open toward the outside of the vehicle in consideration of that the housed items is taken in and out. To hinge portions 97, 99 at the front and rear of the upper plate 89, the bottom end portion of the front hinge arm 100 and the bottom end portion of the rear hinge arm 102 are rotatably supported at the front and rear sides by the collars 104 and the screws 106, respectively.

The top end portions of the front hinge arm 100 and the rear hinge arm 102 are protruding upward from opening portions 109, 111 formed on the upper plate 89, respectively, and respective flange portions 112, 114 formed on these top end portions are attached to the back surface of the lid 95 by screws 115. Here, at one side of each of the opening portions 109, 111 on the top surface of the upper plate 89, a recessed escape portion 118 of the respective flange portions 112, 114 are formed so that the respective flange portions 112, 114 of the respective hinge arms 100, 102 do not interfere with the upper plate 88 when the lid 95 is closed. Here, onto the left item housing chamber 81, a key cylinder unit 120 is provided. Note that the reference numeral 117 denotes a seal material to be attached to the back surface of the lid 94.

Figure 18:
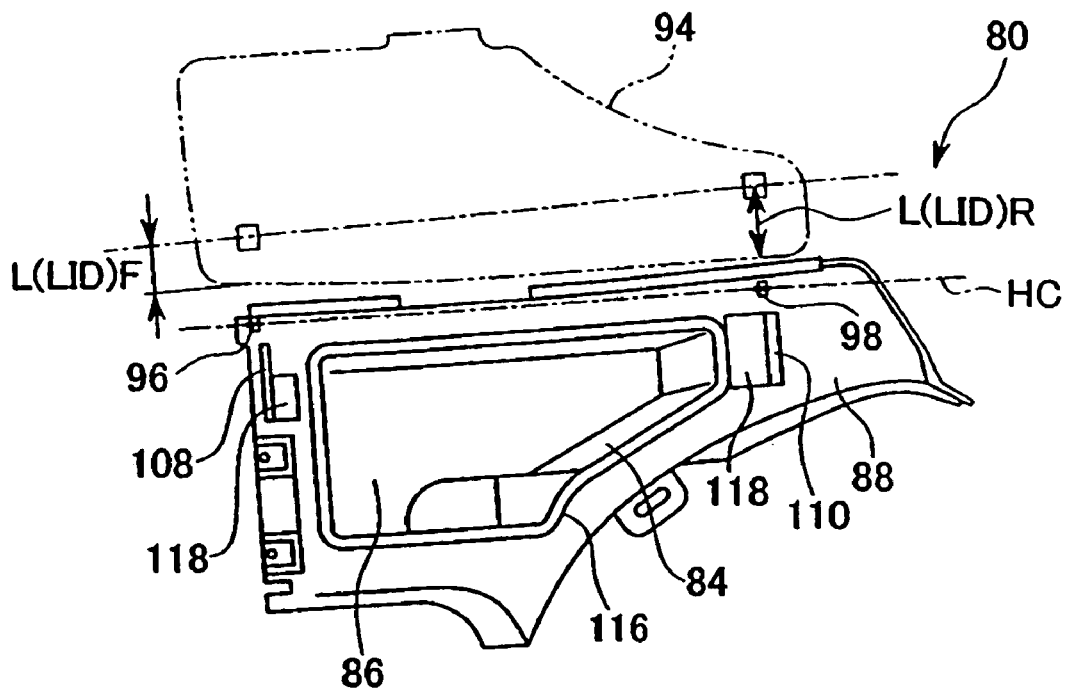
FIG. 18 is a plan view of the right item housing chamber.
Figure 22:
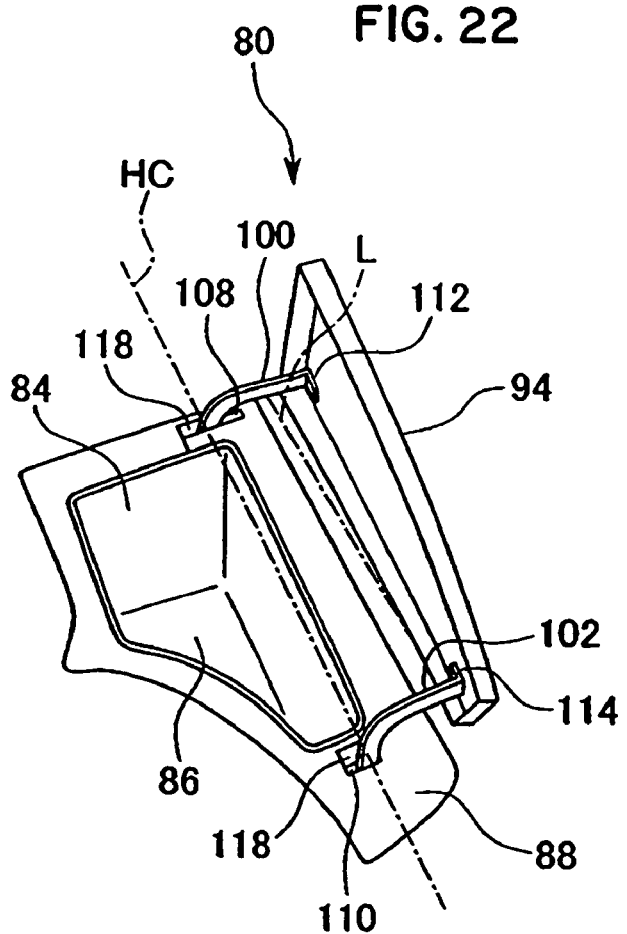
FIG. 22 is a perspective view showing a state where a lid of the right item housing chamber is opened.

Next, based on FIGS. 18, 19 and 22, description will be made of the front hinge arm 100 and the rear hinge arm 102 by taking the right item housing chamber 80 as an example. Note that, although the lid 94 is a lid which opens to about 90 degrees when fully opened, FIG. 18 shows a state where the lid 94 is opened to 180 degrees for convenience of illustration.

The lid 94 of the right item housing chamber 80 is formed to have an upwardly convex curve along the top edge portion of the side cowl 47. This is because the side cowl 47 is formed such that, in order to save a leg space, the top edge thereof gradually slopes from the side of the fuel tank 37 to have steeper inclination as it comes to the rear side, and thus fits along the under-knee part of the driver (see FIG. 19).

The lid 94 can be opened and closed by means of the front hinge arm 100 and the rear hinge arm 102. Since the lid 94 is curved in an upward convex shape, the protruding portions from the hinge portions, that is, over-hung portions OV that are portions protruding from the attaching portions of the flange portions 112, 114 of the hinge arms 100, 102, are made close to the upper plate 88 especially at the front side. This is because, since the front side of the side cowl 47 is more flat, the front over-hung portion OV is closer to the upper plate 88 than the rear over-hung portion, which gradually slopes downward. Accordingly, the over-hung portion OV of the lid 94 which is protruding frontward from the front hinge portion 96 is, when the lid 94 is fully opened, namely, when opened to about 90 degrees, as shown as an inner limb L by a dash-dotted line in FIG. 22, displaced inwardly to approach a hinge center HC. That is, depending on the lengths of the hinge arms 100, 102, when the lid 94 is opened toward the outside from a closed state, the inner limb L of the lid 94 of the over-hung portion OV may interfere with an outside portion of the upper plate 88.

It goes without saying that, in order to prevent the over-hung portion OV from interference, it is possible to make the front hinge arm 100 and the rear hinge arm 102 long so that both hinge arms 100, 102 do not interfere with the upper plate 88. However, the trajectory of opening/closing the lid 94 is required to be inside of the outer surface of the side cowl 47. In other words, it is required that the item is easily taken in and out by keeping the lengths of the respective hinge arms 100, 102 sufficiently long while the lengths of the respective hinge arms 100, 102 are made as short as possible at the same time.

Figure 23:
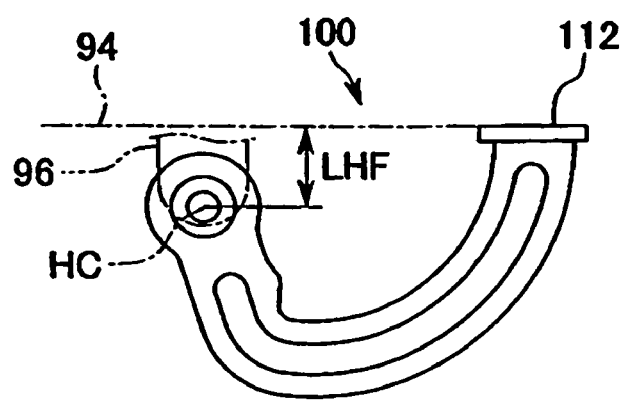
FIG. 23 is a front view of a front hinge arm.
Figure 24:
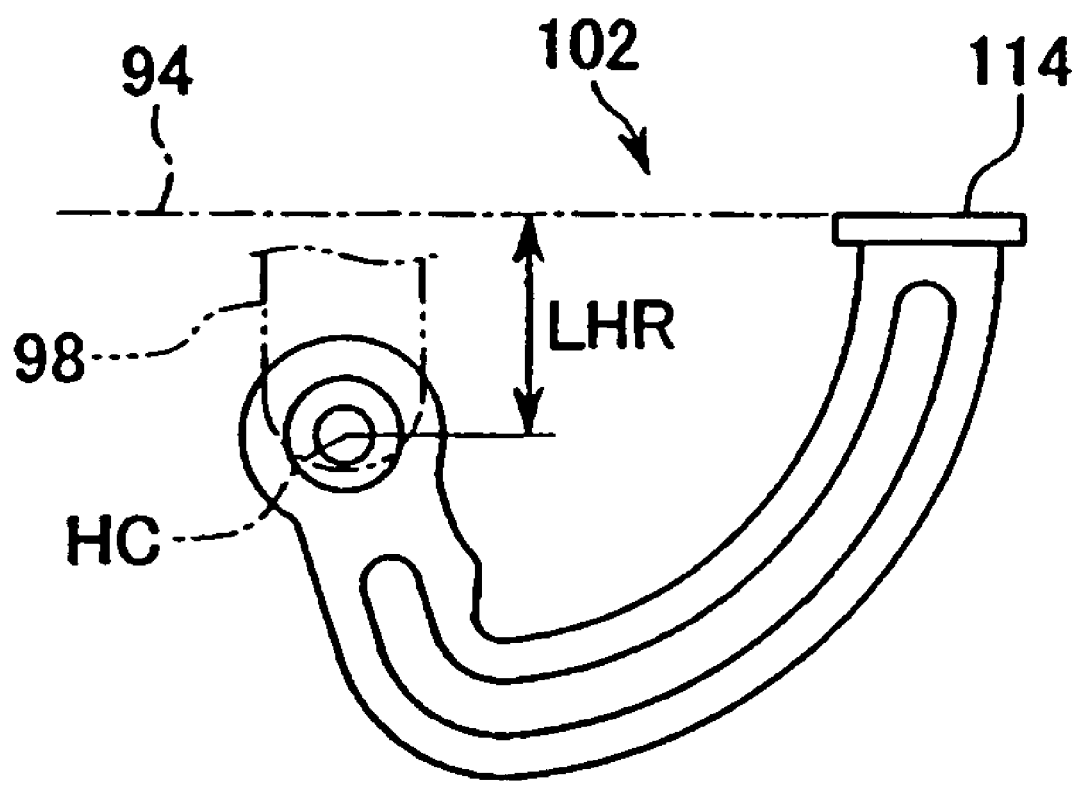
FIG. 24 is a front view of a rear hinge arm.

In view of the above, in this embodiment, the portion, in the over-hung portion OV on the front hinge arm 100 side, which is displaced inwardly when the lid 94 is fully opened, and the rear hinge arm 102 side, which has little over-hang and a small degree of approaching the upper plate 88, is made as long as possible but not to protrude toward outside of the side cowl 47 in order to secure the easiness of taking in and out the housed item. Meanwhile, the length of height between the attaching position of the flange portion 112 of the front hinge arm 100 (see FIG. 23) and the hinge center HC (front hinge portion 96) at the time of closing the lid 94 (LHF) is made shorter than the length of height between the attaching position of the flange portion 114 of the rear hinge arm 102 (see FIG. 24) and the hinge center HC (rear hinge portion 98) (LHR) (LHF<LHR). Thus, interference between the performance of taking in and out the housed item and the lid 94 is prevented.

Figure 19:
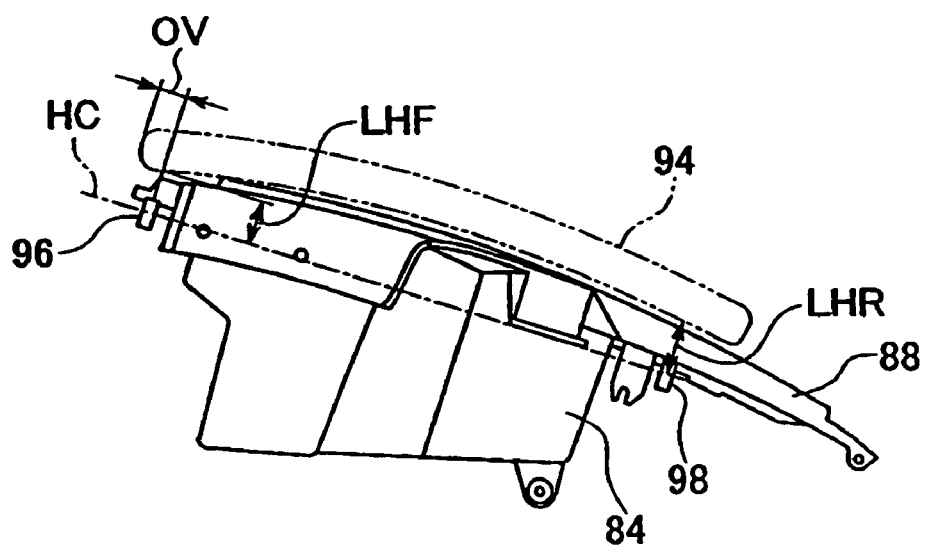
FIG. 19 is a side view of the right item housing chamber.

In other words, by placing the front hinge portion 96 higher than the rear hinge portion 98 (making closer to the lid 94) as shown in FIG. 19, when the respective hinge arms 100, 102 are rotated by 90 degrees from a viewpoint of the hinge center HC, the front side of the lid 94 is made to follow a higher rotation trajectory by the difference between the foregoing length LHR and the length LHF, whereby the front side of the lid 94 is set apart from the upper plate 88 by the inwardly displaced portion and thus the interference is prevented.

Therefore, degree of freedom in molding the side cowl 47 is secured without restriction due to the right item housing chamber 80. Note that description will be omitted with respect to the left item housing chamber 81 since it is similar to the above.

In this way, the item housing units are structured such that the opening portions 86, 87 of the upper plates 88, 89 of the right and left item housing chamber 80, 81, which are provided interior of the side cowls 47, 47 at the sides of the fuel tank 37 and between the fuel tank 37 and the side cowls 47, 47, can be opened and closed by the lids 94, 95. Here, when the upper plates 88, 89 are curved in an upward convex shape, the lids 94, 95 are supported, by the front hinge arm 100 and the rear hinge arm 102, to be able to open and close, and the over-hung portions OV protruding forward from the front hinge portions 96, 97 to approach the upper plates 88, 89 are formed on the lids 94, 95, in order for the front portions of the lids 94, 95 not to interfere with the upper plates 88, 89, the front hinge portions 96, 97 are made higher than the rear hinge portions 96, 97 (made closer to the lids 94, 95). Thus, by using a small hinge arm, a sufficient opening for housing can be formed, and there will not be any restriction on molding the side cowl 47.

Here, in this embodiment, respective lengths L(LID)F, L(LID)R from the side edges of the lids 94, 95 to the attaching portions of the flange portions 112, 114 of the hinge arms 100, 102 are made to be L(LID)F<L(LID)R as shown in FIG. 18. Thus, it is even more ensured that the front sides of the lids 94, 95 do not interfere with the upper plates 88, 89.

As a result, as the item housing chamber shown in Japanese Patent Laid-Open Heisei 11-208551, a problem that when the lid of the chamber opens in the vertical direction, for example, a long arm to secure an opening area and a large housing space for this arm are required can be solved. At the same time, the lids 94, 95 capable of opening in a horizontal direction with short arms can be applied, and structures where the lids 94, 95 do not interfere with parts and items around the lids can be realized.

Note that, although description has been made of a case where the over-hung portions OV close to the upper plates 88, 89 are protruding toward the front from the front hinge portion 96, 97, the above can be also applied when the over-hung portions OV are protruding backward from the rear hinge portions 98, 99. In this case, the positions of the rear hinge portions 98, 99 are set higher than that of the front hinge portions 96, 97 to approach the lids 94, 95.

In other words, depending on the curving degree of the lid and the length of the over-hung portion, by making the vertical positions of the front and rear hinge portions different from each other, a structure is applicable where the housing spaces of the hinge arms can be set at the minimum while the interference by the lid is prevented.

We claim:

1. A windshield unit for a motorcycle comprising:
   a cowling constructed for attachment to a front of the motorcycle,
   a wind screen attached to the cowling,
   an air inlet port connected to the cowling, and
   an air guide plate connected to the cowling, along an upper edge of a meter-visor, and in fluid communication with the air inlet port,
   wherein the air guide plate includes a step portion disposed along a width direction of the air guide plate, the step portion including an open sidewall drain, and
   the air guide plate includes an opening portion, provided along a bottom edge thereof, that provides structure to direct wind to a back side of the air guide plate.

2. The windshield unit according to claim 1, wherein the step portion comprises a joint portion between the air guide plate and a separate member disposed adjacent to the air guide plate.

3. The windshield unit according to claim 2, wherein the separate member extends above the step portion of the air guide plate.

4. The windshield unit according to claim 2, wherein the step portion includes a rib that extends in a longitudinal direction.

5. The windshield unit according to claim 1, wherein the step portion includes a rib that extends in a longitudinal direction.

6. The windshield unit according to claim 1, wherein the meter-visor includes an air outlet port that exhausts running wind, provided by the air guide plate opening portion, to an outer side of the windshield.

7. The windshield unit according to claim 6, wherein the air outlet port of the meter-visor includes a louver.

8. The windshield unit according to claim 7, wherein the air guide plate extends along a lower portion of the wind screen.

9. A windshield unit for a motorcycle comprising:
   a cowling constructed for attachment to a front of the motorcycle,
   a wind screen attached to the cowling, the wind screen including a front facing surface and a back facing surface; and
   channeling means for channeling a fluid stream along the back facing surface of the wind screen, wherein the channeling means includes an air guide plate having a step portion,
   wherein the air guide plate includes an opening portion, provided along a bottom edge thereof, that provides structure to direct wind to a back side of the air guide plate.

10. The windshield unit according to claim 9, wherein the channeling means include means for filtering liquid fluid and gaseous fluid.

* * * * *